United States Patent
Morillon et al.

(10) Patent No.: US 9,274,680 B2
(45) Date of Patent: Mar. 1, 2016

(54) METHOD OF SELECTION OF A BUTTON IN A GRAPHICAL BAR, AND RECEIVER IMPLEMENTING THE METHOD

(75) Inventors: Gilles Morillon, Melesse (FR); Nadine Patry, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1275 days.

(21) Appl. No.: 11/513,086

(22) Filed: Aug. 30, 2006

(65) Prior Publication Data

US 2007/0079246 A1   Apr. 5, 2007

(30) Foreign Application Priority Data

Sep. 8, 2005   (FR) .................................... 05 09191

(51) Int. Cl.
  *G06F 3/048* (2013.01)
  *G06F 3/0482* (2013.01)
  *G06F 3/0481* (2013.01)
  (Continued)

(52) U.S. Cl.
  CPC .......... *G06F 3/0482* (2013.01); *G06F 3/04815* (2013.01); *H04N 5/4403* (2013.01); *H04N 21/4312* (2013.01); *H04N 21/4438* (2013.01); *H04N 21/482* (2013.01);
  (Continued)

(58) Field of Classification Search
  CPC . G06F 3/04815; G06F 3/0482; G06F 3/0485; G06F 3/04855; G06F 3/04817
  USPC ......... 715/860, 782, 783, 784, 785, 786, 787, 715/789, 794, 830, 834, 838, 741
  See application file for complete search history.

(56) References Cited

U.S. PATENT DOCUMENTS 5,528,260 A * 6/1996 Kent .................... G09G 5/14
                                                                345/684
6,343,319 B1 * 1/2002 Abensour ............. G09B 5/00
                                                                375/E7.024
(Continued)

FOREIGN PATENT DOCUMENTS

EP        0986901        12/1998
EP    1 107 097 A        6/2001
(Continued)

OTHER PUBLICATIONS

Anonomous, "A Dynamic Menu Bar", Research Disclosure RD292043, www.researchdisclosure.com, Aug. 1988, pp. 1-2.

(Continued)

*Primary Examiner* — Amy Ng
*Assistant Examiner* — Andres E Gutierrez
(74) *Attorney, Agent, or Firm* — Myers Wolin LLC

(57) ABSTRACT

The present invention relates to a method of navigation around documents represented by identifiers displayed on a viewing screen. Navigation commands control the position of a cursor also displayed on the screen, independently of the position of the identifiers. The identifiers automatically scroll over the screen as a function of the position of the cursor on the screen thus defining the direction of scrolling. When the cursor is positioned on an identifier, the latter is highlighted and the user can enter a command to activate the document, for example to reproduce it. Advantageously, the identifiers scroll over concentric carrousels, each carrousel containing identifiers of documents having common properties. The invention also relates to a viewing appliance able to execute a navigation software module.

14 Claims, 3 Drawing Sheets

(51) Int. Cl.
*H04N 5/44* (2011.01)
*H04N 21/443* (2011.01)
*H04N 21/431* (2011.01)
*H04N 21/482* (2011.01)
*H04N 21/422* (2011.01)

(52) U.S. Cl.
CPC . *H04N 21/42222* (2013.01); *H04N 2005/4428* (2013.01); *H04N 2005/4432* (2013.01)

(56) References Cited

U.S. PATENT DOCUMENTS

| | | | |
|---|---|---|---|
| 6,411,337 | B2 | 6/2002 | Cove et al. |
| 6,448,987 | B1 * | 9/2002 | Easty et al. ............... 715/834 |
| 7,013,435 | B2 | 3/2006 | Gallo et al. |
| 7,137,075 | B2 * | 11/2006 | Hoshino et al. ............ 715/848 |
| 7,266,781 | B1 * | 9/2007 | Burlowski ................. 715/834 |
| 7,376,910 | B2 * | 5/2008 | Inui et al. .................. 715/797 |
| 2002/0186413 | A1 * | 12/2002 | Ito ........................... 358/1.18 |
| 2003/0167466 | A1 | 9/2003 | Nakamura et al. |
| 2003/0197738 | A1 | 10/2003 | Beit-Zuri et al. |
| 2004/0085354 | A1 * | 5/2004 | Massand .................... 345/751 |
| 2005/0060666 | A1 | 3/2005 | Hoshino et al. |
| 2005/0081164 | A1 * | 4/2005 | Hama et al. ............... 715/830 |
| 2005/0094014 | A1 | 5/2005 | Haas et al. |
| 2006/0236251 | A1 * | 10/2006 | Kataoka et al. ............ 715/757 |
| 2010/0011308 | A1 * | 1/2010 | Shaw ...................... G06F 17/24  715/765 |

FOREIGN PATENT DOCUMENTS

| | | |
|---|---|---|
| EP | 1510911 | 3/2005 |
| JP | 981032 | 3/1997 |
| JP | 9114902 | 5/1997 |
| JP | 9167049 | 6/1997 |
| JP | 10031477 | 2/1998 |
| JP | 1195968 | 4/1999 |
| JP | 2001222353 | 8/2001 |
| JP | 2003528377 | 9/2003 |
| KR | 1020050010269 | 1/2005 |
| WO | WO9828912 | 7/1998 |
| WO | WO9856188 | 12/1998 |
| WO | WO0116690 | 3/2001 |
| WO | WO 01/69367 A | 9/2001 |
| WO | WO2004023283 | 3/2004 |
| WO | WO2004063862 | 7/2004 |

OTHER PUBLICATIONS

Blais, D., "Le defilement sans fin en ActionScript II—Mrthode avec duplicateMovieClip", http://www.trucsweb.com/Tutoriels/flash/tw365/, Apr. 22, 2003, pp. 1-12.

* cited by examiner

US 9,274,680 B2

METHOD OF SELECTION OF A BUTTON IN A GRAPHICAL BAR, AND RECEIVER IMPLEMENTING THE METHOD

This application claims the benefit, under 35 U.S.C. §119 of French Patent Application 0509191, filed Sep. 8, 2005.

FIELD OF THE INVENTION

The invention relates to a method of navigating among documents displayed on a viewing screen and to a receiver furnished with a user interface using the method.

BACKGROUND

Nowadays, numerous users have at home an appliance for reproducing audio or audiovisual documents. These documents are generally stored in digital form, either in the appliance itself, for example in the hard disk, or within the local network of the residence, or else in a database accessible via a public network such as the Internet. These documents can be videos, audio documents or else still images. To access these documents, the user has available an interface ensuring display and navigation around this whole set of documents. The documents appear on a screen via an identifier, thereby allowing the user to peruse the whole set of accessible documents. The identifiers appear in lists incorporated into menus. This identifier can be the title, or an image, or any other displayable element representative of the document. In the case of an image, this can be an extract of the video, a photo of the artiste for an audio document, a part of a photo, etc. The so-called "graphical" identifier is generally associated with the document by the producer of the said document, it can also be defined and associated by the user himself.

The user interface must make it possible to present the identifiers so that the user navigates between them and can easily find the one that he is searching for and select it. This navigation can also allow the user to browse around and finally create an interest in a document. When the user has found a document, he selects it and performs an action on the latter: obtain information, read the document (watch in the case of a film, listen in the case of music, . . . ), destroy it, purchase it or rent it, etc.

A simple example of a system comprising a database containing documents and a reproduction appliance furnished with a user interface consists of a PVR ("Personal Video Recorder"). A PVR is an appliance furnished with a hard disk, a display means, and a remote control. These appliances can use inter alia remote controls called "Gyration", their feature is to be furnished with gyroscopes so as to transform motion in space into a signal. By moving his remote control to the left, to the right, up or down, the user moves a cursor on the screen, as would a computer mouse by moving over the mat. The Gyration remote control also has conventional keys, in particular for executing actions on the identifier highlighted. The user interface allows the access to audio libraries, photo or even mixed libraries, with different equipment possibly being closer to an individual computer.

The document EP 1 107 097—HITACHI describes a method for displaying and navigating around a collection of icons representing information elements. An icon is highlighted graphically, the graphical highlight moves from icon to icon with the aid of a rotary key placed on the remote control. The rotary key also makes it possible to rotate the whole set of displayed icons. This document does not teach a single means making it possible at one and the same time to indicate to the user which icon is highlighted and the direction of rotation of the carrousel.

The document WO01/69367—VIZIBLE.com describes a U.I. in the form of a sphere, the sphere is festooned with boxes showing in each box elements such as Web sites. The environment is that of a personal computer and the user has available a mouse making it possible to move a cursor making it possible to designate a displayed object. This document does not teach another usage of the cursor.

The present invention presents a new way to navigate through a set of documents, so as to appear at one and the same time attractive and recreational.

SUMMARY OF THE INVENTION

The invention is aimed at a method of navigation around documents represented by identifiers displayed on a viewing screen, comprising a step of displaying a cursor whose position on the screen is controlled by navigation commands, independently of the position of the identifiers, wherein the identifiers scroll over the screen as a function of the position of the cursor on the screen defining the direction of scrolling and, when the cursor is positioned on an identifier, the method comprises a step of highlighting the identifier authorizing the activation of the associated document by the entry of a command.

In this way the user sees the identifiers of the documents scroll, imagettes for example. He can at one and the same time select identifiers and control scrolling by using his remote control. When the cursor is situated on an identifier, the highlighting of this identifier signals to him that he can instigate a command and thus activate this document with a view to performing an action, its reproduction for example. Moreover, by controlling the position of the cursor, the user fully defines the direction of scrolling, as well as possibly its speed.

A first refinement consists in that the accessible documents are ranked groupwise according to attribute values. The identifiers associated with the documents of one and the same group possess a common graphical feature so as to distinguish them from the other groups. In this way, the user can navigate among documents possessing a common characteristic, the same topic for example. According to a refinement, the scrolling is designed to portray the identifier in a carrousel. The groups are represented by concentric carrousels, a graphical feature of the identifiers of one and the same group defines its membership in a carrousel. The portrayal of a carrousel offers an attractive novelty in respect of the user since the documents appear as in a shop display rack that the user can rotate, the documents seem to move about on the screen in a three-dimensional space.

Another refinement consists in that the various carrousels rotate at different speeds. Thus, after a revolution, the same identifiers do not occur at the same location. So that, if one identifier masks another, the revolution after this situation cannot occur. Another refinement consists in that the angular speed of a carrousel depends on the number of identifiers in this carrousel. In this way, if a carrousel contains few identifiers, the time where the screen appears without identifier of this carrousel is shorter.

According to another refinement, the documents are ranked in each carrousel according to the user's interest in the associated document. Advantageously, the identifiers of the documents having the largest interest value are present in the outer carrousel. In this way, the documents which appear closest on the screen are actually those which seem the most interesting for the user.

According to another refinement, if the number of documents of a group is less than a predetermined number, then each document of this group is associated with at least two graphical identifiers. In this way, there is always a sufficient number of identifiers to represent the carrousel on the screen and give the impression of motion in a three-dimensional space. According to another refinement, if the number of documents of a group is greater than a predetermined number, then at least two documents of this group are associated with one and the same graphical identifier. In this way, the user is not swamped by a multitude of identifiers appearing in a carrousel, the limited number of identifier allows good readability.

According to another refinement, the height of the placement of each graphical identifier in a carrousel depends on a value of attributes of the document associated with the identifier. In this way, the user navigation interface has available another way to rank and to position the documents other than the choosing of a carrousel from among a plurality of carrousel. According to a refinement, the position of the cursor on the screen is a parameter taken into account for the calculation of the speed of scrolling of the identifiers. In this way, by using the same pointing facility as that intended to select documents, the user can also control the speed of scrolling, the sense of scrolling and the stopping of scrolling.

The present invention is also aimed at an electronic appliance comprising a means of display of a series of identifiers representing at least one document and of a cursor, a means of entry of an action of a user, the said means making it possible to control the movement of the cursor on a viewing screen connected to the means of display, independently of the position of the identifiers, wherein the display means automatically scrolls the identifiers over the screen as a function of the position of the cursor on the screen defining the direction of scrolling, and highlights an identifier when the cursor is positioned on this identifier, the document associated with this identifier can then be activated with the aid of the means of entry.

BRIEF DESCRIPTION OF THE DRAWINGS

Other characteristics and advantages of the invention will now appear with further details within the scope of the description which follows of exemplary embodiments given by way of illustration while referring to the appended figures which represent.

DETAILED DESCRIPTION

Figure 1:
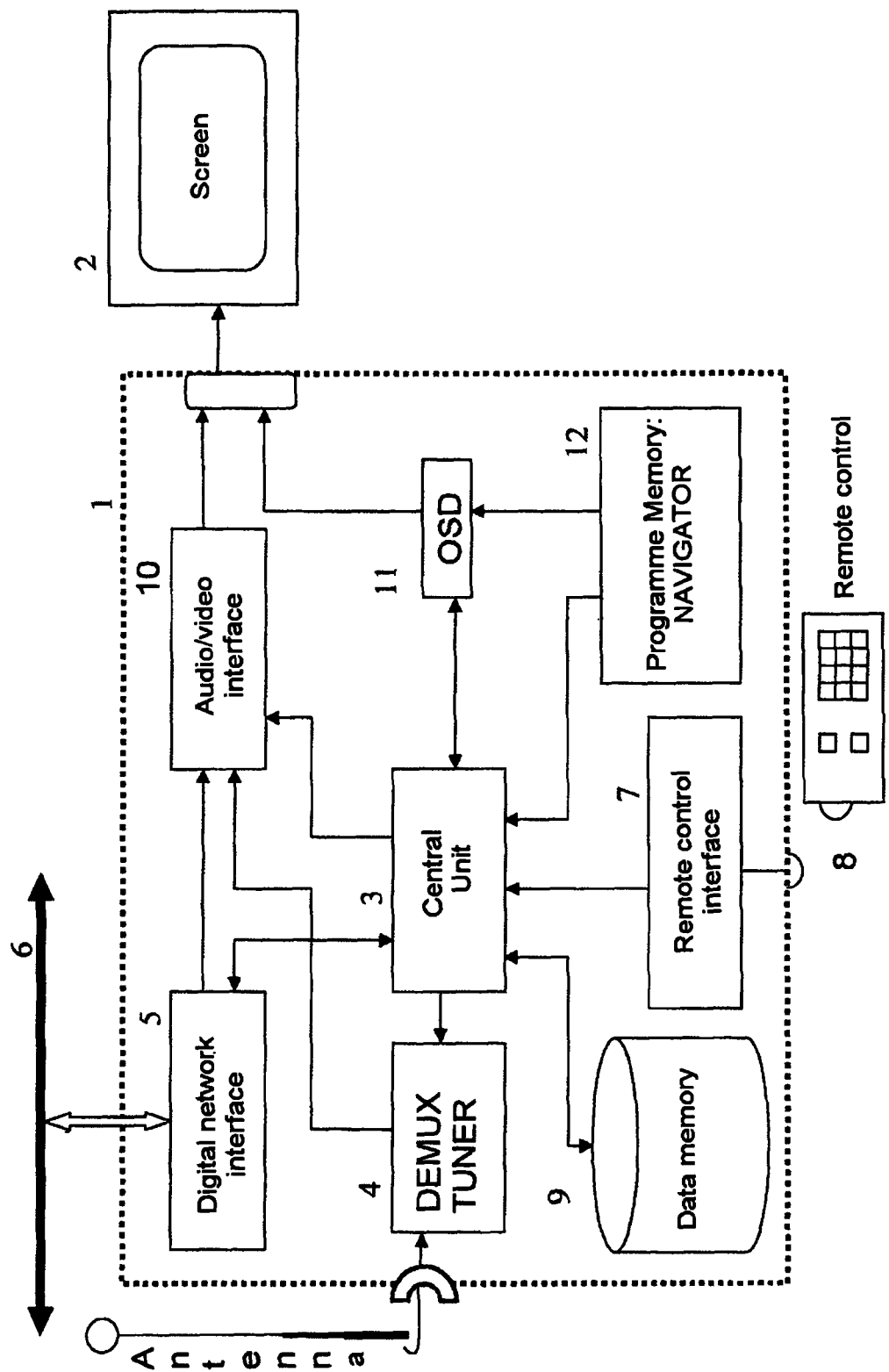
FIG. 1 is a block diagram of a multimedia receiver for the implementation of an exemplary embodiment of the invention.

We describe first of all the structure of a multimedia receiver 1 furnished with a display device 2 according to an exemplary embodiment of the invention. We here describe a decoder but other appliances are also envisageable and apply to the present invention, for example a personal computer or a PVR (for example the model THOMSON DTH7000 produced and marketed by the applicant) or any appliance capable of accessing audiovisual contents and having means of creating and displaying menus. The receiver comprises a central unit 3 linked to a program memory 12, and an interface 5 for communication with a high-speed digital bus 6 making it possible to transmit audio/video data in real time. This network is preferably public and makes it possible to access remote servers; the commonest is the IP network. The receiver can also receive audio/video data from a transmission network through a reception antenna associated with a demodulator 4. The receiver furthermore comprises an infrared receiver of signals 7 for receiving the signals from a remote control 8, a memory 9 for the storage of audiovisual and database contents, and audio/video decoding logic 10 for the generation of the audiovisual signals dispatched to the television screen 2. The remote control 8 is for example of "Gyration" type. It is furnished with gyroscopes so as to transform motion in space into a signal. By moving his remote control to the left, to the right, up or down, the user moves a cursor on the screen, as he would do with a computer mouse by moving it over the mat. It comprises at least one key of functions such as "OK" the role of which we will see later. The memory 9 is advantageously a hard disk of several hundred megabytes, making it possible to record several hours at least of audiovisual contents. These audiovisual contents are identified by a recorded title and/or one or more imagists in the database. It is these imagists which will be displayed in the user interface.

The receiver also comprises a circuit 11 for displaying data on the screen, often called an OSD circuit, or "On Screen Display" circuit. The OSD circuit 11 is a text and graphics generator which makes it possible to display on the screen menus, pictograms (for example, a number corresponding to the station viewed) and which makes it possible to display the navigation menus in accordance with the present invention, and in particular one or more button bars. The OSD circuit 11 is controlled by the Central Unit 3 and a program called the user navigation interface recorded in the memory 12. The user interface is advantageously embodied in the form of a program module recorded in a read only memory. It can also be embodied in the form of a specialized circuit of ASIC type for example.

The digital bus 6 and/or the transmission network transmit to the receiver data comprising multimedia contents and data descriptive of these contents. These data originate either from a transmission network, or from the digital network 6. The descriptive data comprise classification elements generally called "attributes", for the accessible multimedia contents. The descriptive data are for example metadata defined according to the standard MPEG7, for example the title or an image identifying the associated document. These data are stored in the database of the memory 9 of the receiver and are continually updated. The user navigation interface thereafter extracts the information from this database and processes it so as to produce the navigation menus displayed on the screen.

Let us now see how the user navigation interface operates.

Figure 2:
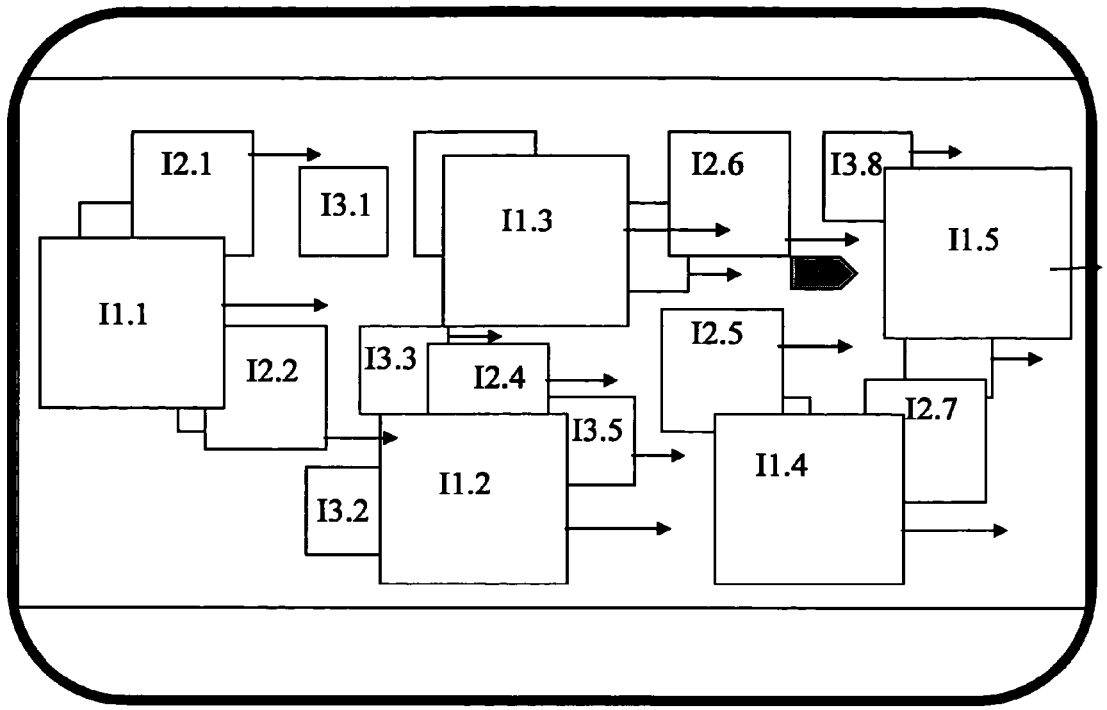
FIG. 2 presents an example of a screen shot displayed by the user interface for navigating among the documents.

FIG. 2 shows a screen shot generated by the user interface. Each document is at least identified by an "imagette". The term "imagette" designates a small image comprising few pixels, the low precision makes it possible however to identify the subject and the association with the document is thus ensured. If no imagette is available, the navigator displays the title of the document in a frame. The screen shot comprises imagettes, a cursor and a scroll strip. The cursor appears in FIG. 2 as a big black arrow. A particularly innovative characteristic of the invention consists in that the cursor makes it possible at one and the same time to select an image and to control their scrollings. If the cursor is situated in the middle of the screen, the images are fixed, the carrousel stops rotating. If the cursor deviates from the area at the centre of the screen, the images scroll from left to right when the cursor is placed in the left part, or from right to left when the cursor is placed in the right part. The further the cursor deviates from the area at the centre, the greater is the speed at which the images move. The control of the cursor is ensured by the movements of the Gyration remote control. If the user moves it to the right, the cursor will also move to the right. Of course, one would not deviate from the subject of the present invention by using more conventional remote controls furnished with the four direction keys ↑, ↓, → and ←.

Figure 3:
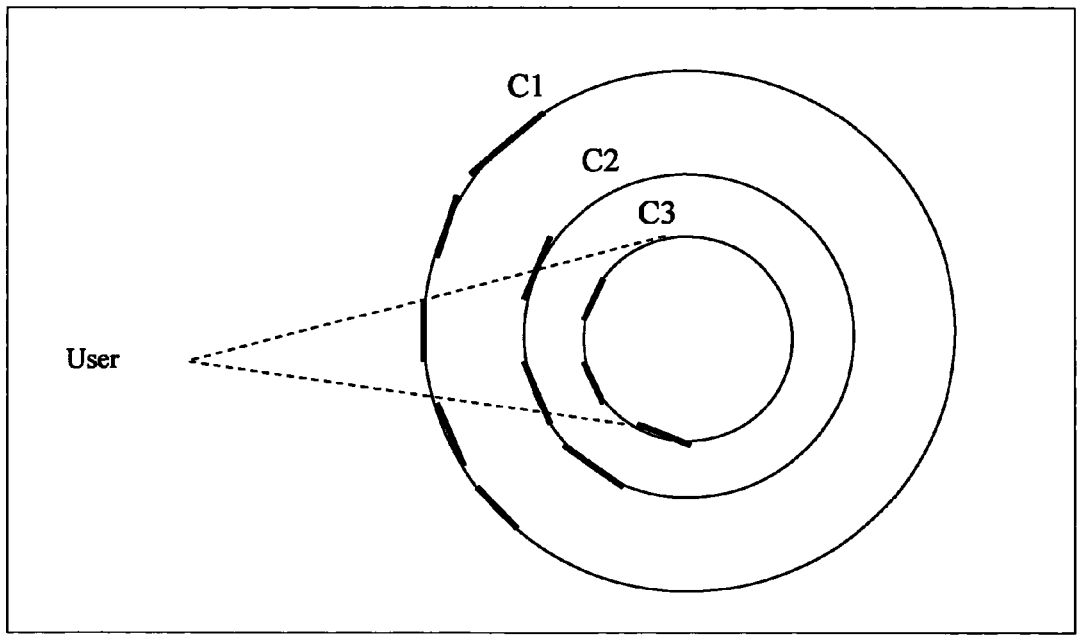
FIG. 3 illustrates the zone of vision of a user seeing on his screen the three carrousels according to an exemplary embodiment of the invention.

Another particularly innovative characteristic of the invention consists in that the user interface gives the impression of depth, the imagettes seeming on the screen to move on several concentric carrousels. FIG. 3 shows three concentric carrousels C1 the outermost, C2 in the middle and C3 the closest to the centre of rotation. FIG. 3 presents a virtual view showing the zone of vision of a user in the form of an angular sector. The user sees the images scroll in three different planes in one sense and also sees in a background plane the images of the three carrousels scroll in the other sense (for the sake of clarity, the background images are not represented in FIG. 1). Advantageously, the luminosity of the images in the plane of the background is attenuated, to give the user the impression of separation. This impression of depth emerges with the aid of several technical characteristics generated by the user interface. Firstly the imagettes of the carrousel C1 which are virtually the closest to the user, are larger than those of C2 and C3. Next, the imagettes of C1 can overlap those of C2 and C3. As we shall later, the scroll speeds of the three carrousels are different, so that the user quickly realizes that certain images, the largest, overlap the others and therefore deduces there from the existence of several carrousels. Finally, the imagettes on the plane of the background strengthen the impression of separation by scrolling in the reverse sense, appearing markedly smaller and with a very attenuated luminosity.

According to a refinement, when a carrousel contains few identifiers, typically fewer than 20 documents, the user interface places two imagettes for the document in the carrousel. If the carrousel contains fewer than 10 documents, then the user interface displays three imagettes per document. This makes it possible to preserve the three-dimensional aspect of the carrousel and avoids holes on account of the small number of imagettes. The user will then re-encounter the same imagette in the carrousel either two or more times. As a variant, a document is identified by several different imagettes. In the case of a video, the images are extracted from the video. In the case of an audio document, this can be an image containing the title of the piece, and images representing the singer. Conversely, if the number of documents per carrousel is very large, the user interface groups together several documents in one and the same imagette. For example, televised series or newscasts can easily be identified by an image. Optionally under this image is found a text indicating the episode numbers or the dates and the times of the various newscasts, or else the number of documents represented by this identifier. As a variant, the user can perform groupings of documents and associate them with one and the same image so as to identify them.

According to another refinement, the angular speeds of the carrousels are different. In this way, if an image of C1 masks an image of C2 or C3, it is shifted rapidly and the user can see the others as backdrop. For example, the speed of C1 is 120% of that of C2, and that of C3 is 80% of that of C2. The speeds of a few identifiers are represented by arrows in FIG. 1, the length of the arrow is proportional to the speed. Recall that the position of the cursor controls the overall speed of the carrousels. The speed value of each carrousel varies in a continuous manner as a function of the distance separating the vertical axis passing through the centre of the screen and the cursor.

According to a variant, the angular speed of a carrousel depends on the number of documents present in the carrousel. For example, if the carrousel contains 30 identifiers, a carrousel revolution lasts 3 seconds, if the carrousel contains 20 identifiers, then a carrousel revolution lasts only 4 seconds. In this way, if a carrousel has few elements, the intervals between the elements do not last long and the user preserves the impression of depth of the carrousels. The speeds indicated above are maximum speeds, given that the user can always slow them down by modifying the position of the cursor, to bring it closer to the vertical axis passing through the centre of the screen. A refinement consists in imposing the rule that the number of imagettes present on a carrousel be greater than that of the carrousel of an immediately lower diameter. To adjust the number, it suffices to add identifiers for one and the same document or to group together several documents under the same identifier. In this way, it is certain that the speeds will be different. The numbers of identifiers per carrousel being relatively similar, the visual effect is particularly interesting.

Figure 4:
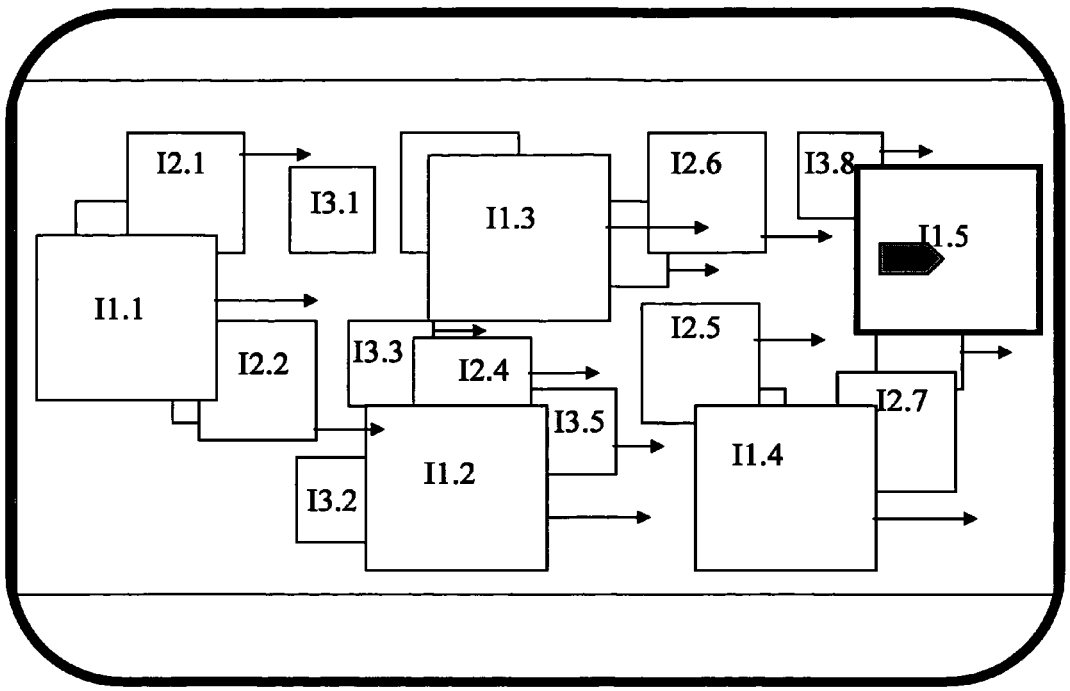
FIG. 4 presents an example of a screen shot displayed by the user interface when an identifier is highlighted.

When the cursor is placed on an imagette, either because the user moves it, or because of its scrolling, the frame of the imagette thickens, highlighting this identifier. This state is illustrated by FIG. 4. Any other graphical distinction (blinking, extra brightness, enlargement of the image) is also possible. At this juncture, the user interface can display limited information (not represented) in a small frame, such as the name of the recording, for example. This information must be limited and non-overlapping, so as not to impede the viewing of the other imagettes, insofar as the carrousel continues to scroll.

Figure 5:
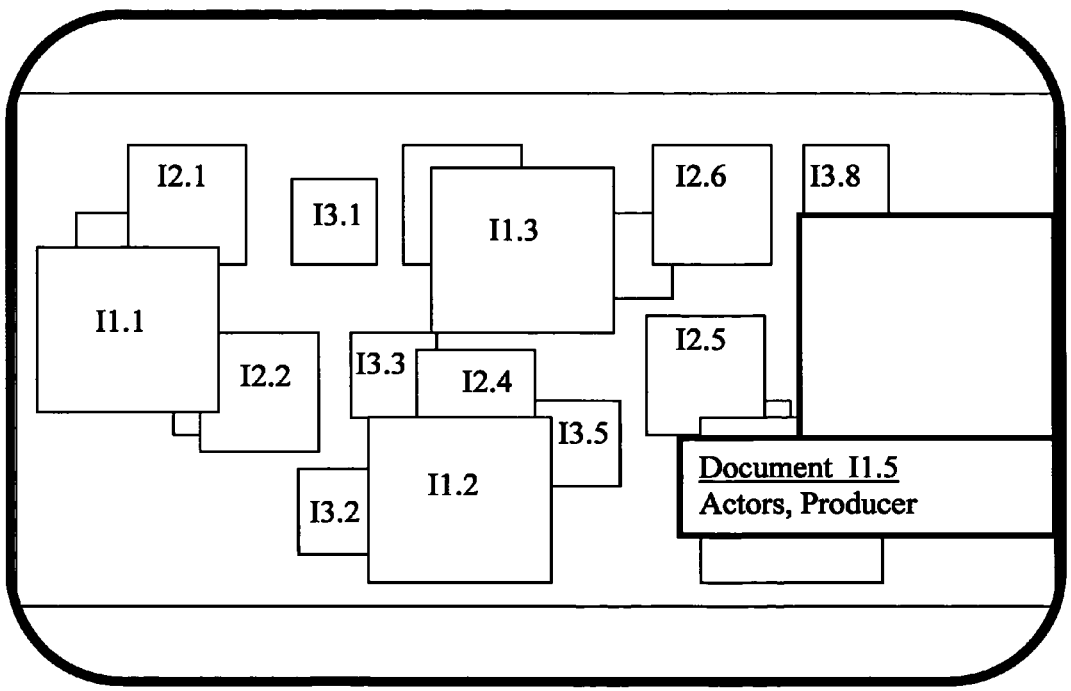
FIG. 5 presents an example of a screen shot displayed by the user interface after the selection of the identifier of a document.

When an identifier possesses the focus, the user can select it by pressing on the "OK" key of the remote control. The screen shot then looks like FIG. 5. The user interface exits the navigation mode and enters a mode of exploration of the selected document. The carrousel stops, the imagette containing the selected document is magnified and a start of information is added in a new frame. Here are some examples of displayable information:

name of the document, the type,
the actors and the producer
the possible actions:
obtain detailed info on the recording,
destroy it by erasing it from the memory 9,
view it,
lock/unlock it (parental control),
purchase it and download it from a remote database.

If the user presses the "OK" key a second time, then the imagette and the associated document are no longer selected, the carrousel restarts and the screen resumes the shot of FIG. 4.

The position and the size of the imagettes in the three carrousels are determined by the user interface according to a certain number of criteria. According to a preferred exemplary embodiment, the most interesting documents are presented on the outer carrousel C1, and the least interesting, on the inner carrousel C3. In this way, the preferred documents most apt to be chosen by the user are presented further forward on the carrousel C1, the largest imagettes being more accessible than those of the other two carrousels C2 and C3.

A user's interest in regard to a document can be measured with the aid of an index calculated by correlating the attributes related to this document and the user's preferred topics, or else entered manually by the user. For example, membership of a document in a favourite list is a condition for portraying it on the carrousel C1.

When the number of documents accessible to the user interface becomes too large, according to a refinement, it is possible to perform a filtering so as to keep only a reduced list of documents to be displayed. This filtering can be performed by keeping only documents complying with certain criteria. Advantageously, the navigation interface selects documents possessing three determined values of attributes, and places them according to these values in one of the three carrousels. Assume for example that the user's preferred topics are in the order: films, documentaries, newscasts. So, the documents are placed in one or the other of the carrousels as a function of this criterion: film identifiers are on the carrousel C1, documentary identifiers on C2 and identifiers of televised newscasts on C3.

According to another refinement, the identifiers are not placed in a random manner on the carrousel, but their horizontal and vertical positions stem from a calculation performed by the user interface. The calculations are performed on the basis of the attribute value.

A first way to position an identifier consists in dividing the carrousel into three areas vertically, each area constituting a circular strip. For example, ranking into one or the other area is performed as a function of the topic of each document. The user interface displays the identifiers of the documents associated with sport in the upper banner, which appears at the top of FIG. 2, the middle banner presents film identifiers, the banner in the lower position contains televised newscast identifiers. All the other documents complying with none of the three topics are not represented in this carrousel. The user interface comprises assignment and programming keys allowing the user to assign each area and/or each carrousel to a determined topic. A second way consists in assigning a horizontal marker to each carrousel. When the user interface is run, the carrousel's first viewing window is at the origin of the circular marker, the carrousel viewing angle is "0". Then, the carrousel rotates, the viewing angle goes from "0" to 360°. The navigation interface assigns a value of angle to each document as a function of one or more criteria.

According to a preferred example, these criteria pertain to viewing. Here are the three criteria in order of priority

| | |
|---|---|
| rented films (highest priority), | group A |
| documents viewed only in part, | group B |
| documents not yet viewed, even in part, | group C |
| documents viewed in full. | group D |

This ranking comprises the advantage that at the moment of appearance of the carrousel, the identifiers relating to rented films and that must be returned quickly, will be viewed first (angle 0). Thereafter, by rotating the carrousel, the user will see the identifiers of the films viewed only in part (angle about 90°), he will thus be able to select them so as to finish viewing them. Finally, he will see the documents not yet viewed (angle about 180°), then those viewed in full, and finally those which are already viewed in full (angle about 270°) and therefore are of least interest.

We note therefore that the carrousel organization makes it possible to place the identifiers in two ways: the presence in this or that carrousel, and the vertical placement in a carrousel. The user interface uses these placement criteria by associating them with selection criteria characterizing each document. These selection criteria use the metadata associated with the documents, for example:
  date obtained,
  type obtained: recording, rental, purchase, copy, . . . rental,
  last date of partial viewing (not finished watching): +recent,
  last date of complete viewing,
  A manual score (rating, like stars on iTunes or WMP),
  An automatic score,
  topic (film, news, series, sport, . . . ): as a function of the user preferences,
  user's preferences.

There exist several ways to produce an imagette identifying a document. The commonest is to extract from a video document an image or an image part representative of the document in question. Another way consists in the producer of the document formulating the imagette so as to make its identifier. For example, the display of a film is its identifier in the carrousel. The imagette is thereafter incorporated in compressed form into the data associated with the document. Another way consists in the user himself performing the association between an imagette and the document. For example, an audio document is associated with the photo of the singer.

Although the present invention has been described with reference to the particular embodiments illustrated, it is in no way limited by these embodiments, but is so only by the appended claims. It will be noted that changes or modifications may be made by the Person skilled in the art to the embodiments described above, without thereby exceeding the scope of the present invention.

The invention claimed is:

1. A method of navigation around documents represented by identifiers appearing in a menu displayed on a viewing screen, comprising:
  dividing the documents into a plurality of groups, each group being represented by one of a plurality of scrolling concentric carrousels containing the identifiers of the documents belonging to this group;
  displaying a cursor on the screen;
  controlling the position of said cursor by navigation commands, independently of the position of the identifiers of the documents;
  scrolling together the plurality of carrousels over the screen as a function of the position of the cursor in the menu displayed on the screen defining the direction of scrolling and the speed of scrolling, the angular speeds of the plurality of carrousels being different, the difference between the angular speeds of two carrousels being constant; and
  positioning the cursor on one of the identifiers to trigger highlighting of the identifier and to authorize activation of the document associated with this respective identifier by an entry of a command.

2. The method of navigation according to claim 1, comprising ranking the documents groupwise according to attribute values, the identifiers associated with the documents of one and the same group having at least one common graphical feature so as to distinguish them from the other groups.

3. The method of navigation according to claim 2, wherein each identifier of one and the same group having one and the same graphical feature.

4. The method of navigation according to claim 2, wherein the attribute values for the ranking of the documents represents a user's interest in the associated documents, the identifiers of the documents having the largest interest value being present in an outer carrousel.

5. The method of navigation according to claim 3, wherein the attribute values for the ranking of the documents represents a user's interest in the associated documents, the identifiers of the documents having the largest interest value being present in an outer carrousel.

6. The method of navigation according to claim 1, wherein if the number of documents of a group is less than a predetermined number, each document of this group is associated with at least two graphical identifiers.

7. The method of navigation according to claim 1, wherein if the number of documents of a group is greater than a predetermined number, at least two documents of this group are associated with one and the same graphical identifier.

8. An electronic appliance comprising:
a display circuit for displaying a series of identifiers in a menu representing at least one document and a cursor,
a control unit for entering an action of a user, said control unit being configured to control the movement of the cursor on a viewing screen connected to the display circuit, independently of the position of the identifiers,
a central unit for dividing the documents into a plurality of groups, each group being represented by one of a plurality of scrolling concentric carrousels containing the identifiers of the documents belonging to this group,
wherein the display circuit automatically scrolls together the plurality of carrousels over the screen as a function of the position of the cursor in the menu displayed on the screen defining the direction of scrolling and the speed of scrolling, the angular speeds of the plurality of carrousels being different, the difference between the angular speeds of two carrousels being constant,
and wherein, when the cursor is positioned on one of the identifiers, the display circuit highlights this respective identifier and the control unit authorizes activation of the document associated with this respective identifier.

9. The electronic appliance according to claim 8; wherein the central unit is configured to rank the documents groupwise according to attribute values, the display circuit is configured to apply a common graphical feature to the identifiers associated with the documents of one and the same group.

10. The electronic appliance according to claim 9; wherein the graphical feature of the identifiers of one and the same group defines membership in a carrousel.

11. The electronic appliance according to claim 9, wherein the attribute values for the ranking of the documents represent a user's interest in the associated documents, and wherein the display circuit portrays the identifiers of the documents having the largest interest value in an outer carrousel.

12. The electronic appliance according to claim 10, wherein the attribute values for the ranking of the documents represent a user's interest in the associated documents, and wherein the display circuit portrays the identifiers of the documents having the largest interest value in an outer carrousel.

13. The electronic appliance according to claim 8, wherein the display circuit displays at least two graphical identifiers associated with each document of a group when the number of documents of this group is less than a predetermined number.

14. The electronic appliance according to claim 8, wherein the display circuit displays one and the same graphical identifier associated with at least two documents of a group when the number of documents of this group is greater than a predetermined number.

* * * * *